though some 2-amino-thiazole is certainly formed as an intermediate.

3,799,941
PROCESS FOR THE PRODUCTION OF SULFURIC ACID SOLUTIONS OF 2 - AMINO - 5 - NITRO-THIAZOLE

Horst Kindler and Hans-Gerhard Fischer, Frankfurt am Main-Fechenheim, Wilhelm Antoni, Bischofsheim, and Ewald Appel, Frankfurt am Main-Fechenheim, Germany, assignors to Cassella Farbwerke Mainkur Aktiengesellschaft, Frankfurt am Main-Fechenheim, Germany
No Drawing. Filed Jan. 27, 1972, Ser. No. 221,412
Claims priority, application Germany, Feb. 4, 1971, P 21 05 156.9
Int. Cl. C07d 91/34
U.S. Cl. 260—306.8 R          6 Claims

ABSTRACT OF THE DISCLOSURE 2-amino-thiazole bisulfite is introduced into at least three times its weight of sulfuric acid of a concentration of at least 90% and is then nitrated to produce the title product.

---

2-amino-5-nitro-thiazole is a readily decomposable compound which may explode on storing. The present invention relates to a simple, economic and safe process for the production of sulfuric acid solutions of 2-amino-5-nitro-thiazole.

For the preparation of 2-amino-5-nitro-thiazole, it is known (Dickey, Towne and Wright, J. Org. Chem., vol. 20, p. 499 et seq. (1955) in particular p. 505, line 16, as well as Kasman and Taurins, Canadian J. of Chem., vol. 34, p. 1261 (1956)) to nitrate 2-aminothiazole in 96% sulfuric acid with nitric acid. Decomposable 2-nitro-amino-thiazole is formed as an intermediate (Canadian J. of Chem., vol. 34, p. 1262, line 12 (1956)). The latter is converted, in a strongly exothermic reaction, to 2-amino-5-nitro-thiazole (Canadian J. of Chem., vol. 34, p. 1264, lines 9–12, as well as p. 1269, lines 17–18, (1956)). Another byproduct which is formed (Babo and Prijs, Helv. Chim., Acta 33, p. 309, lines 32–33 (1950)) is the explosive 2-nitroamino-5-nitro-thiazole.

Unfortunately, 2-amino-thiazole is of poor stability in acid solutions. For instance, in concentrated sulfuric acid it is continuously decomposed, particularly in the presence of heat. The introduction of large amounts of 2-amino-thiazole in acid solution requires a long time and, in spite of intensive cooling, a local rise in temperature is unavoidable at the introduction site. This causes part of the 2-amino-thiazole to decompose and the yield of 2-amino-5-nitro-thiazole is reduced proportionately.

Consequently and particularly in the case of large batches, the technical performance of the nitration of 2-amino-thiazole is difficult and can easily involve a decomposition of the reaction mixture as a whole. Due to the side reactions, the yield of isolatable 2-amino-5-nitro-thiazole is only about 50% of the theory (Canadian J. of Chem., vol. 34, p. 1269, lines 20 and 30 (1956)). Moreover, it is known from British Pats. 938,080 and 1,157,601 to prepare 2-amino-5-nitro-thiazole by introducing 2-amino-thiazole nitrate into concentrated sulfuric acid. For this purpose, it is first necessary to prepare 2-amino-thiazole nitrate from 2-amino-thiazole or 2-amino-thiazole hydrochloride and recover this nitrate. It is also, however, decomposable and explosive.

It is an object of the present invention to avoid the drawbacks of the processes hitherto known and to present a simple, economic and, above all, safe process for the production of 2-amino-5-nitro-thiazole.

More particularly, the present invention is concerned with a process for the preparation of sulfuric acid solutions of 2-amino-5-nitro-thiazole. In accordance with this process, 2-amino-thiazole bisulfite is introduced into at least three times its weight of sulfuric acid of a concentration of at least 90% and it is then nitrated.

Preferably, the 2-amino-thiazole bisulfite is introduced into 8 to 30 times its weight of sulfuric acid.

During the introduction of the 2-amino-thiazole bisulfite, the temperature of the sulfuric acid should normally be maintained below 30° C., preferably below 15° C.

The requisite starting material, 2-amino-thiazole bisulfite, is a compound which may easily be prepared in a known per se manner (U.S. Pat. 2,489,038) by forming more than one molar equivalent of sulfurous acid in an aqueous solution of 2-amino-thiazole (for instance by simply introducing sulfur dioxide) and reacting resulting solution at a temperature of 25–105° C. The 2-amino-thiazole-sulfurous acid reaction product obtained in a nearly quantitative yield is a practically water-insoluble precipitate which may easily be separated. Whereas the empirical formula determined for this compound corresponds to that of 2-amino-thiazole bisulfite, the solubility in water and the chemical behavior of this substance militate against the assumption that it is a simple amine salt. The exact chemical structure of this compound is not yet known. This compound, which is referred to herein as "2-amino-thiazole bisulfite," is more stable than the 2-amino-thiazole.

Since it is known that 2-amino-thiazole is obtained from 2-amino-thiazole bisulfite only by boiling with strong mineral acids (U.S. Pat. 2,489,038, col. 2, line 21), it is surprising and, indeed, unexpected that 2-amino-thiazole bisulfite, which is suspended according to the present invention in cold sulfuric acid, may be easily and completely nitrated to form 2-amino-5-nitro-thiazole.

Moreover, it is surprising that the sulfur dioxide set free does not react with the added nitric acid to form nitrosylsulfuric acid which might then cause a diazotization of the 2-amino-thiazole or of the 2-amino-5-nitro-thiazole already formed (see Houben-Weyl, "Methoden der Organ.-Chemie," fourth edition, vol. 10/3, (1965), p. 27; G. T. Morgan and H. D. K. Drew, Soc. 117, p. 791 (1920)).

According to the present invention the amount of sulfuric acid employed, the concentration of which should be at least 90%, must correspond to at least three times the amount by weight of the 2-amino-thiazole bisulfite to be reacted. Apart from that, however, it may vary within a wide range. Since the most useful sulfuric acid solutions of 2-amino-5-nitro-thiazole normally involve a concentration of less than 10% by weight, preferably of about 8–9% by weight, it is preferable to initially use a weight ratio of sulfuric acid and 2-amino-thiazole bisulfite which yields a sulfuric acid solution of 2-amino-5-nitro-thiazole of the desired concentration.

In carrying out the process of the present invention, it is preferred to use the sulfuric acid in the form of its monohydrate, hereinafter and in the specific examples briefly called "monohydrate."

An outstanding advantage of the process of the present invention consists in that, during the addition of the 2-amino-thiazole bisulfite to the preferably cooled sulfuric acid, only a small amount of heat is set free so that the solid may continuously be introduced. If this introduction is done rather quickly whilst simultaneously sucking off the sulfurous acid, one can even observe a slight cooling down of the reaction mixture.

Since it is possible to start the nitration immediately after or even during the introduction of the 2-amino-thiazole bisulfite, no decomposition of the amino-thiazole occurs. Consequently, the desired 2-amino-5-nitro-thiazole is not only obtained with a good yield but it is also absolutely free from impurities.

In general, the identity of the nitrating agent employed is not critical. It is possible to use nitric acid, mixed acids, alkali metal nitrates in dehydrating acids, etc. Mixtures of highly concentrated nitric acid and concentrated sulfuric acid, preferably the commercial mixed acid having a ratio of 50:50 or solutions of potassium nitrate in concentrated sulfuric acid are particularly preferred. During the nitration, the temperature is preferably maintained below 30° C.

With a view to avoiding foaming, it is possible to eliminate, during the introduction of the 2-amino-thiazole bisulfite which is done before or during the nitration, part of the sulfur dioxide being formed, either with the aid of a slight vacuum or by introducing air.

As stated hereinbefore, according to the process of the present invention, the introduction of the 2-amino-thiazole bisulfite into the sulfuric acid and the nitration may also be carried out simultaneously.

In carrying out the process of the present invention, formation of nitrous gases has not been observed when pure initial products are employed. Consequently, it does not appear essential to attempt to prevent such formation. However, for precautionary reasons, it is possible to add urea without the course of the reaction being disturbed.

It is possible to avoid over-nitration by potential measuring, for instance by means of a platinum-electrode which is dipped into the mixture, against a calomel electrode. It is surprising that the sulfur dioxide which may be present in different concentrations has no influence on the potential measuring and that a potential of about 750 mv. as originally measured for the 2-amino-5-nitro-thiazole remains constant until the termination of the nitration. Only when free nitric acid is formed, the potential suddenly rises to values above 1000 mv. Thus it is possible to avoid an over-nitration which leads to the formation of the decomposable 2-nitramino-5-nitro-thiazole (potential over 1200 mv.). This measuring method works precisely and is reproducible so that it is possible to titrate a 2-amino-thiazole solution of an unknown concentration in concentrated sulfuric acid with a mixed acid of a known composition.

Excess nitric acid, if any, may be recovered by the addition of 2-amino-thiazole bisulfite.

The reaction mixture obtained according to the present invention at the end of the nitration should be freed from dissolved sulfur dioxide either by stirring in vacuo or by introducing air. It contains more than 90% by weight of the theory of 2-amino-5-nitro-thiazole and no impurities at all. Consequently, a separation of the decomposable solid 2-amino-5-nitro-thiazole which may not be stored is normally unnecessary. For further treatment, the solution may be diluted, after the addition of ice, down to a sulfuric acid concentration of 65–70% and diazotized at −12° C. in a known per se manner by the introduction of aqueous sodium nitrite solution. If desired, the 2-amino-5-nitro-thiazole may also be isolated. For this purpose, the reaction mixture is diluted by the addition of ice, neutralized and the separated 2-amino-5-nitro-thiazole is isolated.

The following examples are given for the purpose of illustrating the present invention. All temperatures are given in degrees centigrade.

EXAMPLE 1

1680 g. monohydrate are cooled down to 10°. Within 40 minutes 273 g. 2-amino-thiazole bisulfite (of 100%) are introduced at 10–15°, whereafter the introduction of 189 g. commercial mixed acid having a ratio of 50:50 is immediately started. At 10–20°, the introduction is terminated after approx. 2 hours and the platinum electrode which is dipped into the mixture, shows against the calomel electrode a potential rise from about 750 mv. to 1000 mv. The dissolved sulfur dioxide is eliminated by blowing out with dry air.

Obtained are 2046 g. of a sulfuric acid solution containing according to the spectroscopic determination 10% by weight 2-amino-5-nitro-thiazole which corresponds to 94% of the theoretical.

EXAMPLE 2

For comparison reasons 2-amino-thiazole is nitrated according to the known process.

1680 g. monohydrate are cooled down to 10° and admixed with 150 g. 2-amine-thiazole. Due to the strong heat effects the addition requires 2 hours' time.

The subsequent nitration requires an addition of only 170 g. mixed acid having a ratio of 50:50 until a potential rise occurs. Obtained are 2000 g. of a sulfuric acid solution containing according to the spectroscopic determination 8.7% by weight 2-amino-5-nitro-thiazole which corresponds to 80% of the theoretical.

EXAMPLE 3

182 g. 2-amino-thiazole bisulfite are introduced at 10–15° into 1500 g. monohydrate. 2 g. urea are added and admixed at 25–30° with simultaneous potential control within one hour with a solution of 101 g. potassium nitrate in 505 g. sulfuric acid of technical grade (96%). The dissolved sulfur dioxide is eliminated by stirring in vacuo. The solution thus obtained contains according to the spectroscopic determination 6.0% by weight 2-amino-5-nitro-thiazole which corresponds to 92% of the theory.

EXAMPLE 4

2300 kg. monohydrate are introduced into a vessel, cooled down to 15° and admixed within 40 minutes at 10–15° with 273 kg. 2-amino-thiazole bisulfite of 100%. Subsequently, part of the sulfur dioxide formed is eliminated by evaporation during approx. 15 minutes at 200 mm./Hg. Beginning at a temperature of 10° which may rise up to 30°, 94.5 kg. nitric acid in the form of a mixed acid having a ratio of 50:50 are allowed to run into the mixture. The termination of the nitration is determined by potentiometric measuring by means of a platinum electrode which is dipped into the mixture, against a calomel electrode, the addition of the mixed acid being interrupted as soon as the potential of about 750 mv. as originally determined rises to values above 1000 mv.

The sulfur dioxide being still present in the reaction mixture is eliminated by stirring for one hour in a vacuum of about 200 mm./Hg.

Obtained is a sulfuric acid solution containing 8% by weight 2-amino-5-nitro-thiazole which corresponds to a yield of 98% of the theoretical.

What is claimed is:

1. A process for the production of 2-amino-5-nitro-thiazole which comprises introducing 2-amino-thiazole bisulfite into at least three times its weight of sulfuric acid of a concentration of at least 90% by weight while maintaining the temperature of said sulfuric acid at a temperature below 30° C., and nitrating resulting 2-amino-thiazole bisulfite suspended in said sulfuric acid at a temperature below 30° C. until a sulfuric acid solution of 2-amino-5-nitro-thiazole is obtained.

2. The process of claim 1 wherein said 2-amino-thiazole bisulfite is introduced into 8 to 30 times its weight of said concentrated sulfuric acid.

3. The process of claim 1 wherein the sulfuric acid, during said introduction of 2-amino-thiazole bisulfite, is maintained at a temperature below 15° C.

4. The process of claim 1 wherein by-product sulfur dioxide dissolved in said sulfuric acid solution is removed.

5. The process of claim 1 wherein the agent employed for nitrating is nitric acid, a mixture of highly concentrated nitric and sulfuric acids or an alkali metal nitrate dissolved in sulfuric acid.

6. The process of claim 1 wherein said 2-amino-thiazole bisulfite is produced by forming more than one molar equivalent of sulfurous acid in an aqueous solution of 2-amino-thiazole, reacting resulting solution at a temperature of 25–105° C. and recovering resulting 2-amino-thiazole-sulfurous acid reaction product precipitated from said solution.

References Cited

UNITED STATES PATENTS 2,489,038  11/1949  Kuh et al. _____ 260—306.8 R
3,113,947  12/1963  Currie _____ 260—306.8 R RICHARD J. GALLAGHER, Primary Examiner